United States Patent [19]

Madsen et al.

[11] Patent Number: 5,358,193
[45] Date of Patent: Oct. 25, 1994

[54] TAPE GUIDE FOR A DATA CARTRIDGE

[75] Inventors: David D. Madsen, Lakeland, Minn.; David P. Smith, Hudson, Wis.; Robert A. von Behren, Lilydale, Minn.

[73] Assignee: Minnesota Mining and Manufacturing Company, St. Paul, Minn.

[21] Appl. No.: 102,533

[22] Filed: Aug. 4, 1993

Related U.S. Application Data

[63] Continuation of Ser. No. 773,454, Oct. 9, 1991, abandoned.

[51] Int. Cl.⁵ .......................................... G11B 23/087
[52] U.S. Cl. .................................... 242/342; 242/346
[58] Field of Search ............... 242/192, 197, 198, 199, 242/200, 76; 226/97, 196, 197; 360/132, 130.21

[56] References Cited

U.S. PATENT DOCUMENTS

| | | | |
|---|---|---|---|
| 3,033,074 | 5/1962 | Schaefer | 242/76 X |
| 3,156,398 | 11/1964 | Lauxen et al. | 226/97 |
| 3,185,365 | 5/1965 | Rayfield et al. | 226/50 |
| 3,405,884 | 10/1968 | Patterson, Jr. | 242/76 |
| 3,692,255 | 9/1972 | Von Behren | 242/192 |
| 4,071,177 | 1/1978 | Burdorf | 226/97 X |
| 4,182,472 | 1/1980 | Peekna | 242/76 X |
| 4,231,532 | 11/1980 | Popou et al. | 360/132 X |
| 4,276,575 | 6/1981 | Schoettle et al. | 226/198 X |
| 4,305,536 | 12/1981 | Burdorf et al. | 226/97 X |
| 4,324,372 | 4/1982 | Majicek et al. | 242/192 |
| 4,484,719 | 11/1984 | Schoenmakers | 242/76 X |
| 4,700,254 | 10/1987 | Oishi et al. | 360/132 |
| 4,736,904 | 4/1988 | Schoettle et al. | 242/199 |
| 4,749,146 | 6/1988 | Bridger et al. | 226/97 X |
| 4,751,602 | 6/1988 | Beaujean | 242/76 X |

FOREIGN PATENT DOCUMENTS

| | | |
|---|---|---|
| 0373884 | 6/1990 | European Pat. Off. |
| 8713607.4 | 12/1987 | Fed. Rep. of Germany |
| 2239734 | 2/1975 | France |
| 2386100 | 10/1978 | France |
| 1002180 | 8/1965 | United Kingdom |
| 1489692 | 10/1977 | United Kingdom |

OTHER PUBLICATIONS

*Tension Gradient Measurement of Magnetic Tape*, IEEE Transactions on Magnetics, vol. Mag-20, No. 5, Sep. 1984, pp. 921-923.

*Primary Examiner*—Daniel P. Stodola
*Assistant Examiner*—John P. Darling
*Attorney, Agent, or Firm*—Gary L. Griswold; Walter N. Kirn; Charles D. Levine

[57] ABSTRACT

A belt driven reel-to-reel tape cartridge includes two tape guides for guiding the tape to and from respective tape reels. The tape guides have a large radius of curvature and are flanged to form a long trough to guide and align the tape to improve tape tracking. This also provides hydrodynamic lift by creating an air film between the tape and the tape guide to reduce the friction between the tape backside and the tape guide. The radius of curvature can be constant or can vary from a larger radius at the ends to a smaller radius in the middle.

18 Claims, 2 Drawing Sheets

TAPE GUIDE FOR A DATA CARTRIDGE

This is a continuation of patent application Ser. No. 07/773,454 filed Oct. 9, 1991, now abandoned.

TECHNICAL FIELD

The present invention is directed to tape guides for guiding the tape in a reel-to-reel data tape cartridge. More particularly, the present invention relates to tape guides which reduce the required drive force and improve tape tracking.

BACKGROUND OF THE INVENTION

The belt-driven data tape cartridge of yon Behren, U.S. Pat. No. 3,692,255 has become a standard interface with computers where rapid acceleration and deceleration of the tape are required. In these reel-to-reel tape cartridges, an elastic driving belt extends along a belt path around corner guide rollers positioned adjacent the tape reels, contacts the tape on the reels, and drives the tape from reel to reel. A tape path extends between the reels and along one edge of the cartridge across a cutaway portion providing access to the tape by a transducer such as a magnetic read/write head which is a part of a tape drive which receives the cartridge. The tape path is defined by a guide pin, a pair of tape guides, and in some cartridges, a pair of tape wrap pins. One tape wrap pin is positioned between each reel and the adjacent tape guide to deflect the tape from a straight line path between the tape supply on the reel and the tape guide. This increases the frictional coupling between the tape and the tape wrap pin as the amount of tape wound on the reel increases and helps to maintain constant tape tension at the magnetic head.

Belt driven tape cartridges must meet minimum tape tension specifications while simultaneously maintaining maximum drive force specifications. The tape tension must not fall below a certain level as the tape passes from reel to reel or contact between the read/write head and the tape will be insufficient. The minimum achievable tape tension should be sufficiently high to improve cartridge operation. Similarly, the maximum required frictional drive force should be as low as possible to enhance cartridge operation within the power limitations of the drive motor. Thus, there is a limitation on the frictional drive force. The frictional drive force is that portion of the drive force which affects power loss at the interface between the tape backside and the tape guide. There is a continuing need to further minimize the frictional drive force and to improve tape tracking thereby to further enhance cartridge operation. This can be accomplished by minimizing the friction at the interface between the tape and the tape guides, which accounts for approximately one-third of the drive force in a data cartridge.

SUMMARY OF THE INVENTION

A belt-driven, reel-to-reel magnetic tape data cartridge according to the present invention includes large radius, low friction tape guides. The tape guides can have a constant or varying radius and produce the effect of a long trough to steer, guide, and align the magnetic tape and damp out the undesirable effects due to the eccentricity of the tape hubs before the tape passes the read/write head to improve tape tracking. The larger radius also provides hydrodynamic lift to reduce the friction between the tape backside and the tape guide, which accounts for about one-third of the drive force in the data cartridge.

DETAILED DESCRIPTION OF PREFERRED EMBODIMENTS

Figure 1:
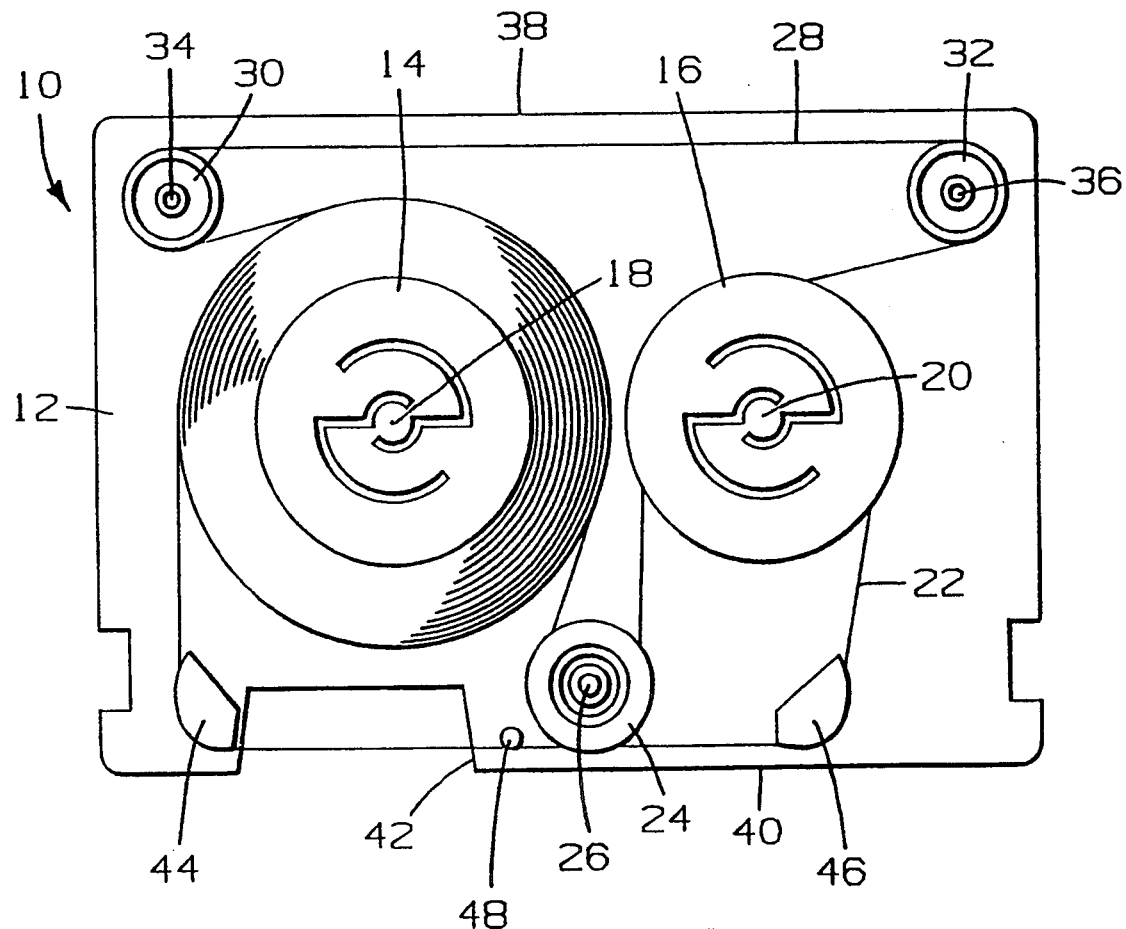
FIG. 1 is a top view of a belt driven data tape cartridge with the cover removed incorporating tape guides according to the present invention.

The drawings illustrate a data cartridge used in a recording and/or reproducing machine, known as a tape drive (not shown). The tape drive typically includes a support frame including a horizontal cartridge support deck which supports a magnetic transducer or recording head and in a depending manner supports a reversible drive motor. The shaft of the drive motor extends through and carries a drive roller above the support deck. Guides position the cartridge on the support deck. FIG. 1 illustrates a top view of a tape cartridge having tape guides according to the present invention. The cartridge 10 is a thin generally rectangular enclosure.

As shown in FIG. 1, the cartridge 10 includes a base plate 12 and a cover (not shown). Two tape reels 14, 16 are mounted for rotation on respective tape reel pins 18, 20 pressed into the base plate 12, within the cartridge 10. The magnetic tape 22 is driven from reel to reel via a drive system including a drive roller 24 which is mounted for free rotation on a drive roller pin 26. The drive roller 24 drives a driving belt 28 which winds around corner guide rollers 30, 32 and the tape reels 14, 16. The guide rollers 30, 32 guide the driving belt 28 and are rotatably mounted on guide roller pivot pins 34, 36 mounted at opposite corners of the cartridge base plate 12 along a back edge wall 38 parallel to the front edge wall 40. The front edge wall 40 has a cutaway portion 42 for access to the magnetic tape 22 by the magnetic recording head. A door (not shown) closes the cutaway portion 42 when the cartridge 10 is not in use. An opening (not shown) extends into the front edge wall 40 to provide access for the drive roller of the tape drive.

The driving belt 28 is thin, continuous, flexible, and elastic. It extends along the belt path around the drive roller 24 and the corner guide rollers 30, 32 and contacts the tape 22 on the tape reels 14, 16. The unstretched length of the driving belt 28 is less than the length of the belt path. Thus, when the belt 28 is stretched around the belt path it generates a belt tension which provides a frictional engagement force or side load between the guide rollers 30, 32 and their respective pivot pins 34, 36 as well as between the belt 28 and the tape reels 14, 16. The frictional engagement force also presses the tape layers together to prevent slippage between the tape layers wound on the tape reels 14, 16 and spilling of the tape 22 from the supply reel. Since the frictional engagement force is dependent on belt tension, the tape tension and drive force are dependent on the belt tension.

The guide rollers 30, 32 are constructed to have a predetermined coefficient of friction to provide a predetermined frictional coupling between each guide roller 30, 32 and its pivot pin 34, 36. This frictional coupling applies a predetermined frictional drag to the driving belt 28 as it passes around the guide rollers 30, 32 to increase the tension of the belt 28 and provide the proper tension drop between the tape reels 14, 16.

Tape guides 44 and 46 are also formed on the base plate 12 and guide the magnetic tape 22 to and from respective tape reels 14, 16. A guide pin 48 is disposed on the base plate 12 intermediate the two tape guides 44, 46 and assists the tape guides 44, 46 in guiding the magnetic tape 22. No tape wrap pins are required although they can be used.

The tape 22 is convolutely wound on the tape reels 14, 16 in opposite directions. A tape guide path between the reels 14, 16 is defined by the tape guides 44, 46 and the tape guide pin 48. One tape guide 44 is positioned along the front edge wall 40 of the cartridge 10 on one side of the cutaway portion 42, and the other tape guide 46 and the guide pin 48, are positioned along the edge wall 40 on the opposite side of the cutaway portion 42.

Figure 3:
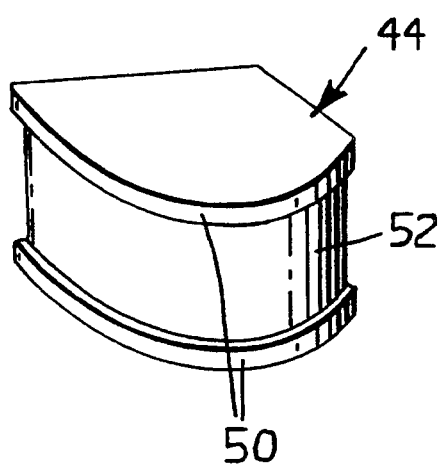
FIG. 3 is a perspective view of one of the tape guides of FIG. 1.

As shown in FIG. 3, the bearing surface of the tape guides 44, 46 includes flanges 50 which constrain and guide the tape 22 within a trough 52. By steering the tape, the trough 52 also can maintain constant the cross web tape tension. Additionally, the tape guides 44, 46 have a much larger radius of curvature than the guide pin 48. The larger radius tape guide 44, 46 allows the tape 22 to travel past the guides 44, 46 with little contact with the bearing surface as the tape rides on an air film. The tape 22 actually lifts off of the guides 44, 46 by at least one micron in some cases. This is measured using a photonic sensor such as an MTI 1000 Fotonic ™ Sensor using a 3808 module made by Mechanical Technology Inc. The large radius provides a mechanism for hydrodynamic lift, as known from Reynolds equation, by creating a film of air under the tape 22 between the tape 22 and the tape guide 44, 46. This is accomplished without resort to known systems such as air jets. This reduces the tape backside-to-tape guide friction, and reduces the drive force by up to 25%, thereby reducing the power dissipation. Preferably, the tape 22 will not contact the tape guides 44, 46 at all, although the tape is expected to contact the guides at some points during operation. It is sufficient to achieve the above advantages that the tape 22 not contact the tape guides 44, 46 along most of the circumference of the tape guides.

Similarly, the tape tracking is improved by up to 50% and there are no shuffle-induced speed variations when the tape guides 44, 46 are used as shown in tests using 2.5 cm (1 in) diameter tape guides 44, 46. Moreover, the range of tape tensions, the difference between the maximum and minimum tape tensions from the beginning of the tape to the end of the tape are reduced. This reduction obviates the need for tape wrap pins which are not used, as mentioned above. In tests comparing the frictional drive force of a single radius 0.27 cm (0.105 in) radius tape guide with single radius 0.95 cm (0.375 in) radius, compound radius 1.27–0.64 cm (0.5–0.25 in) radius, and single radius 1.27 cm (0.5 in) radius tape guides, at various tape speeds, the large radius tape guides uniformly require lower frictional drive forces. The following frictional drive forces in Newtons were attained for the four tape guides at speeds of 0.76, 1.52, 2.29, and 3.05 m/s (30, 60, 90, and 120 in/s), respectively:

| Tape Speed (m/s) | Tape Guide Radius (cm) | | | |
|---|---|---|---|---|
| | .27 | 0.95 | Compound | 2.5 |
| | Frictional Drive Force (N) | | | |
| .76 | .42 | .30 | .25 | .19 |
| 1.52 | .44 | .22 | .12 | .08 |
| 2.29 | .47 | .21 | .10 | .08 |
| 3.05 | .44 | .14 | .08 | .06 |

Figure 2:
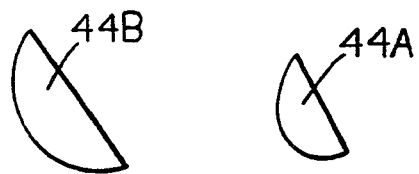
FIG. 2 is a comparison of a constant radius tape guide with a varying radius tape guide.

This larger radius of curvature can be constant, ranging from 0.6 cm to 1.27 cm. Alternatively, to compensate for the space limitations within the data cartridge 10, the radius of curvature can be a varying radius, for example varying from a larger radius at the ends to a smaller radius of 0.6 cm (0.25 in) in the middle, as shown in FIG. 1. In the Figures, the two tape guides 44, 46 have different shapes to accommodate the different space constraints of the data cartridge. The inflection points are blended together with a surface finished, for example, with a 3 micron lapping film such as 3M brand Imperial Lapping Film with 3 micron grade and a 1 mil backing. As shown in FIG. 2, the shape of the varying radius tape guide 44A is much smaller than that of the constant radius tape guide 44B. The varying radius can simply be a compound radius including three separate radii blended together or can be formed of curves such as ellipses or hyperbolas which have varying radii. In FIG. 2, the tape guide 44A represents a tape guide with a single 1.27 cm (0.5 in) radius and the tape guide 44B represents a tape guide with a radius that is 1.27 cm (0.5 in) at the ends and 0.6 cm (0.25 in) in the middle.

The larger radius at the ends provides the desired large radius effects at the entrance of the tape guide 44, 46 for either tape direction. Although the radius in the middle of the tape guides 44, 46 is smaller, and although the air film requires a large radius to be entrapped, once the air film is entrapped in an air bearing due to a large radius, it will remain substantially entrapped regardless of subsequent smaller radius contours. Thus, the hydrodynamic lift is carried over the smaller radius portion to reduce the friction between the tape backside and the tape guide. Tests have confirmed that the varying radius tape guide attains similarly small frictional losses at the interface between the tape backside and the tape guide and that these losses are smaller than those attained with known tape guides having a 0.25 cm (0.1 in) radius.

Moreover, the large radius tape guides 44, 46, whether of single or varying radius, and the flanges 50 create a long trough 52 as the tape 22 enters the tape guide 44, 46. The tape guides 44, 46 serve as a guiding surface which, as it is lengthened, reduces tape pack misregistrations. The long trough 52 steers, guides, and aligns the magnetic tape before the tape passes the read/write head to prevent tape wandering, to improve the tape wrap on the reel, and to improve tape tracking. The trough 52 also damps out the effects of the tape hubs in the tape tracking spectrum.

The surface finish of the tape guides 44, 46 also can affect the performance of the cartridge 10. If the finish is too rough the air film may not be entrapped. A surface finish that is too smooth could result in degraded drive force performance at low tape speeds. Tests have shown that tape guides 44, 46 made of Type 303 stainless steel with the bearing surface polished using lapping film with a diamond grit of 3 microns and having a surface finish, measured with a Taylor-Hobson Talysurf profilometer, ranging from 0.013 to 0.038 microns (0.5 to 1.5 microinches) in average roughness, work well. Other materials, such as plastic, and lower and higher average roughness surface finishes also achieve the desired results.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although the cartridge 10 components are discussed as being mounted on the base plate 12, they can be formed in the cover if desired.

We claim:

1. A belt driven reel-to-reel tape cartridge having a belt which is mounted around a drive roller and rotatable guide rollers, the belt contacting the tape reels to drive the tape reels on respective tape reel pins wherein the tape is convolutely wound on the tape reels in opposite directions, the tape cartridge comprising:

two tape guides mounted for guiding the tape to and from respective tape reels, and for changing the direction of the tape, wherein each tape guide has a bearing surface and at least one tape guide comprises means, including at least one flange formed on the bearing surface, for guiding and aligning the tape to improve tape tracking, wherein the flange is perpendicular to the bearing surface and the flange provides clearance for the tape without an interference fit, and means for hydrodynamically lifting the tape without any external fluid supply to reduce the friction between the tape backside and the tape guide, wherein the lifting means comprises a surface finish selected to provide hydrodynamic lift to reduce the friction between the tape backside and the tape guide; and a guide pin disposed intermediate the two tape guides for guiding the tape, wherein the tape guides and guide pin define a tape guide path between the reels, wherein the tape guides have a larger radius of curvature than the guide pin, a coefficient of friction less than 0.1 when the cartridge operates at speeds of at least 2 m/s, and a surface roughness of less than 0.1 micrometers.

2. The tape cartridge of claim 1 wherein the cartridge has a cutaway portion along a portion of its front edge wall, the tape guides and guide pin are positioned along the front edge wall, and one tape guide is positioned on one side of the cutaway portion and the other tape guide and the guide pin are positioned on the opposite side of the cutaway portion.

3. The tape cartridge of claim 1 wherein both tape guides comprise guiding and aligning means and lifting means.

4. The tape cartridge of claim 1 wherein the guiding and aligning means further comprises a second flange and a trough located between the two flanges, and wherein the distance between the flanges is greater than the width of the tape.

5. The tape cartridge of claim 1 wherein the lifting means comprises the bearing surface having a large radius of curvature of at least 0.6 cm.

6. The tape cartridge of claim 5 wherein the large radius of curvature is substantially constant and is selected from the range of 0.6 cm to 1.3 cm.

7. The tape cartridge of claim 5 wherein the radius of curvature varies from the large radius at both ends to a smaller radius in the middle, wherein the large radius at the ends provides the hydrodynamic lift at the entrance of the tape guide for either tape direction, and wherein the hydrodynamic lift due to the large entrance radius will remain substantially present throughout the entire perimeter of the tape guide.

8. The tape cartridge of claim 7 wherein the overall size of the varying radius tape guide is smaller than that of a constant large radius tape guide having a radius of curvature equal to that of the radius at the ends.

9. The tape cartridge of claim 7 wherein the radius of curvature at the ends ranges from 0.6 cm to 1.3 cm.

10. The tape cartridge of claim 1 wherein the lifting means creates an air film under the tape between the tape and the tape guide to lift the tape from the tape guides and permit the tape to pass around the tape guide without substantial contact between the tape and the tape guide for substantially the entire circumference of the tape guide.

11. A tape guide for mounting in a tape cartridge, for guiding the tape to and from respective tape reels, and for changing the direction of the tape, comprising:

a bearing surface;

means for guiding and aligning the tape to improve tape tracking, wherein the guiding and aligning means comprises at least one flange, wherein the flange is formed on the bearing surface, and wherein the flange is perpendicular to the bearing surface and the flange provides clearance for the tape without an interference fit; and means for hydrodynamically lifting the tape without any external fluid supply to reduce the friction between the tape backside and the tape guide, wherein the lifting means comprises a surface finish selected to provide hydrodynamic lift to reduce the friction between the tape backside and the tape guide by creating an air film under the tape between the tape and the tape guide to lift the tape from the tape guide and permit the tape to pass around the tape guide without substantial contact between the tape and the tape guide for substantially the entire circumference of the tape guide, wherein the tape guide has a coefficient of friction less than 0.1 when the cartridge operates at speeds of at least 2 m/s, and a surface roughness of less than 0.1 micrometers.

12. The tape guide of claim 11 wherein the providing means comprises the bearing surface having a large radius of curvature of at least 0.6 cm.

13. The tape guide of claim 12 wherein the bearing surface has a single large radius of curvature.

14. The tape guide of claim 12 wherein the radius of curvature varies from the large radius at both ends to a smaller radius in the middle, wherein the large radius at the ends provides the hydrodynamic lift at the entrance of the tape guide for either tape direction, and wherein the hydrodynamic lift due to the large entrance radius will remain substantially present throughout the entire perimeter of the tape guide.

15. The tape guide of claim 11 further comprising a second flange and a trough located between the two flanges, and wherein the distance between the flanges is greater than the width of the tape.

16. A tape guide for mounting in a tape cartridge, for guiding the tape to and from respective tape reels, and for changing the direction of the tape, comprising:

a bearing surface;

means for guiding and aligning the tape to improve tape tracking; and means for providing hydrodynamic lift without any external fluid supply to reduce the friction between the tape backside and the tape guide, wherein the providing means comprises the bearing surface having a large radius of curvature and a surface finish selected to provide hydrodynamic lift to reduce the friction between the tape backside and the tape guide, wherein the tape guide has a coefficient of friction less than 0.1 when the cartridge operates at speeds of at least 2 m/s, and a surface roughness of less than 0.1 micrometers.

17. A tape guide for guiding tape to and from respective tape reels in a tape cartridge wherein the tape guide comprises a sector-shaped body having a curved tape bearing surface, and two unequal length planar surfaces, wherein the planar surface that intersects the bearing surface that is intended to be mounted in the tape cartridge closer to the adjacent tape reel is longer than the other planar surface and wherein the bearing surface has a radius of curvature that varies from a larger radius at the ends which intersect the planar surfaces to a smaller radius in the middle, wherein the tape guide has a coefficient of friction less than 0.1 when the cartridge operates at speeds of at least 2 m/s, and a surface roughness of less than 0.1 micrometers.

18. A reel-to-reel data tape cartridge wherein the tape is convolutely wound on the tape reels in opposite directions, the tape cartridge comprising:

two tape guides mounted for guiding the tape to and from respective tape reels, and for changing the direction of the tape, wherein each tape guide has a bearing surface and at least one tape guide comprises means, including at least one flange formed on the bearing surface, for guiding and aligning the tape to improve tape tracking, wherein the flange is perpendicular to the bearing surface and the flange provides clearance for the tape without an interference fit, and means for hydrodynamically lifting the tape without any external fluid supply to reduce the friction between the tape backside and the tape guide, wherein the lifting means comprises a surface finish selected to provide hydrodynamic lift to reduce the friction between the tape backside and the tape guide, wherein the tape guides have a coefficient of friction less than 0.1 when the cartridge operates at speeds of at least 2 m/s, and a surface roughness of less than 0.1 micrometers; and a guide pin disposed intermediate the two tape guides for guiding the tape, wherein the tape guides and guide pin define a tape guide path between the reels.

* * * * *